United States Patent [19]
Klein

[11] Patent Number: 5,143,117
[45] Date of Patent: Sep. 1, 1992

[54] BREAK AWAY CHECK VALVE

[75] Inventor: Donald J. Klein, Jackson, Tenn.

[73] Assignee: Tomkins Industries, Inc., Dayton, Ohio

[21] Appl. No.: 751,554

[22] Filed: Aug. 29, 1991

[51] Int. Cl.[5] .......................................... F16K 15/14
[52] U.S. Cl. .......................... 137/512.15; 137/515.7; 285/915
[58] Field of Search ............... 137/512.15, 515, 515.7, 137/854; 285/915

[56] References Cited

U.S. PATENT DOCUMENTS

| | | | |
|---|---|---|---|
| 286,676 | 10/1883 | Belknap | 137/515.7 |
| 383,428 | 5/1888 | Messinger | 137/515.7 |
| 2,206,356 | 7/1940 | Hutchings | 137/515.7 |
| 2,670,757 | 3/1954 | Delany | 137/515 |
| 3,176,712 | 4/1965 | Ramsden | 137/515.7 X |
| 3,354,903 | 11/1967 | Caruso | 137/512.15 |
| 3,463,189 | 8/1969 | Fitzpatrick | 137/515.7 X |
| 3,530,878 | 9/1970 | Janton | 137/515.7 X |
| 3,739,801 | 6/1973 | Rudolph | 137/102 |
| 3,831,628 | 8/1974 | Kintner et al. | 137/515.7 X |
| 4,043,574 | 8/1977 | Asano | 285/915 X |

Primary Examiner—John Rivell
Attorney, Agent, or Firm—Biebel & French

[57] ABSTRACT

A check valve assembly is disclosed for use with a pool or spa plumbing system and includes first and second hub sections connected together by a nut member. An insert member carrying an elastomeric diaphragm is sandwiched between the first and second hub members to permit fluid flow in a first direction and prevent fluid flow in a second reverse direction. The assembly is designed such that the nut member may be moved longitudinally along one of the hub sections to expose and permit removal of the insert member in a direction transverse to the longitudinal axis of the hub sections. The nut member and insert are configured to cooperate with each other such that the insert may only be mounted in the assembly facing in a predetermined direction.

12 Claims, 3 Drawing Sheets

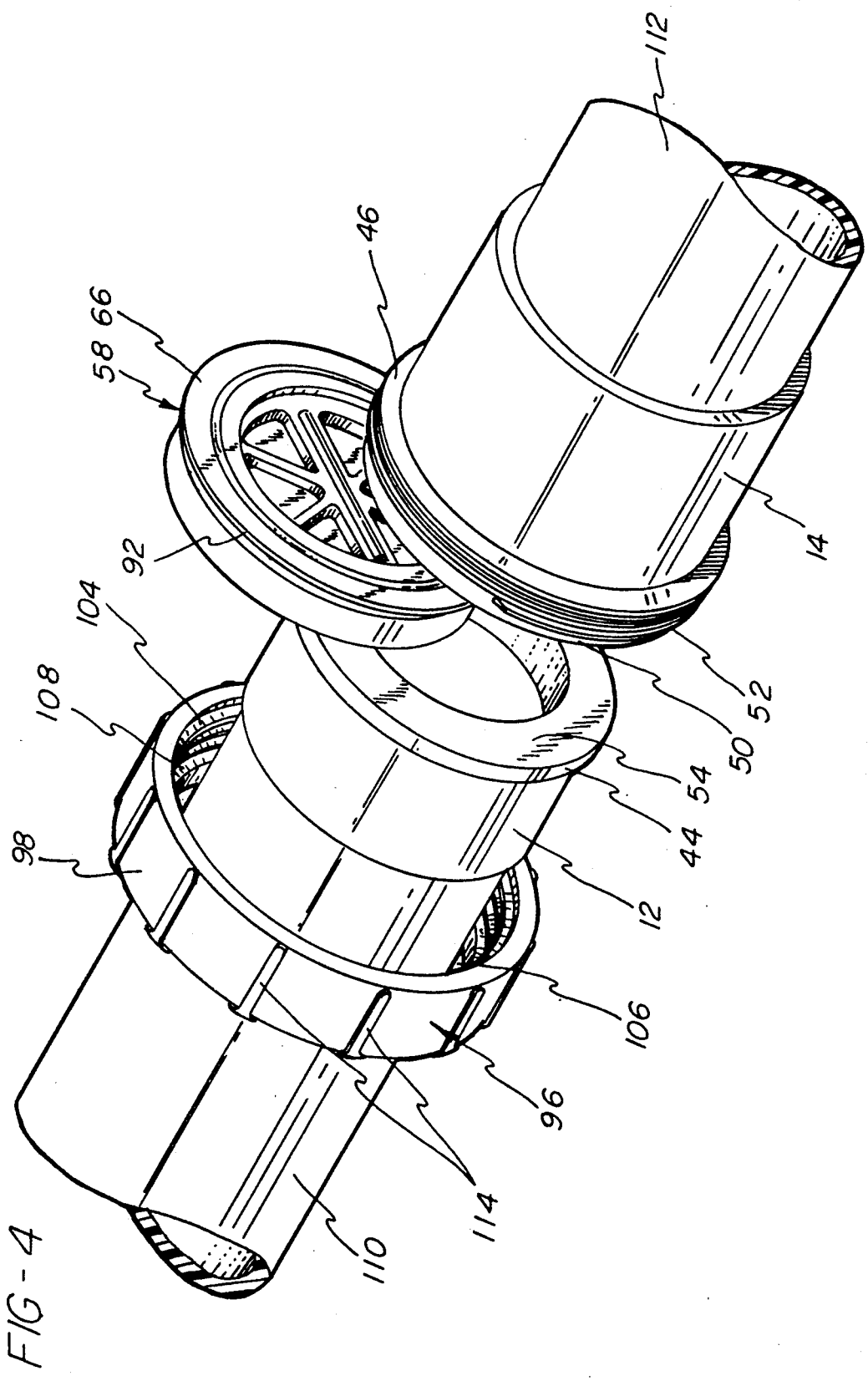

BREAK AWAY CHECK VALVE

BACKGROUND OF THE INVENTION

The present invention relates to a check valve assembly and, more particularly, to a check valve assembly which may be quickly assembled and disassembled for replacement of a regulator portion of the check valve.

The check valve of the present invention is directed toward applications in pipe lines in which low back pressures are experienced. Specifically, swimming pools, spas and tanks have plumbing structures which often require check valves to prevent back flow from filtration systems located at a higher elevation than the motor and pump used to force fluid through the system. Similar check valves may also be used on manifold piping systems where two or more pumps may operate independently of each other and/or at different time intervals. Such check valves may also be used directly in conjunction with pumps wherein the check valve maintains fluid in the housing for priming purposes.

Typically, check valves for swimming pools and spas are installed on the suction side of the pump to control unidirectional flow of water and chemicals to the pump from the pool or spa, and to prevent back flow of the fluid from the pump which may result in debris being deposited in the pool or spa.

Prior check valves have been constructed of various materials including iron, brass, steel, PVC, ABS, polyethylene and polypropylene. Such valves have also included varied configurations including a swinging gate type valve incorporating an elastomeric seal, a plunger cooperating with a seal and biased to a desired position by compression spring and configurations incorporating a movable ball which moves into and out of sealing contact with an orifice.

A common problem with prior valves is that it has been difficult to provide a good back flow seal while also providing for minimum restriction t forward flow through the valve. In addition, many prior art valves have required a large amount of installation space to accommodate the regulator structure operating to control the flow through the valve. Further, most existing valves cannot be repaired and must be cut out of the piping system and replaced with a new valve when the seals on the valve fail or other problems occur in the operation of the valve.

Accordingly, there is a need for a check valve which may be installed into a pool or spa fluid piping system to control unidirectional flow of fluid through the system. The valve should have a compact construction and be easily repaired without the need for cutting or moving the pipe to accommodate the repair operation.

Further, there is a need for a valve which will provide an effective seal against back flow without significantly inhibiting forward flow characteristics of the piping system such that the valve causes a minimal pressure drop within the system.

SUMMARY OF THE INVENTION

The present invention provides a check valve formed of distinct components which are easily separated such that the valve may be quickly repaired after installation.

The check valve of the present invention is formed as an assembly comprising a first pipe section defining a first hub member and having a first sealing surface, a second pipe section defining a second hub member and having a second sealing surface, and an insert member having front and rear surfaces engaging the first and second sealing surfaces, respectively. An aperture is defined through the insert member and a diaphragm member extends across the aperture and acts as a regulator member to allow fluid flow through the insert member in a first direction and to prevent fluid flow through the diaphragm in a second direction.

The insert member includes a main spoke member extending diametrically across the aperture of the diaphragm member and a plurality of additional spoke members are provided extending diametrically across the aperture and intersecting the main spoke member.

The diaphragm member includes a tab portion and a pair of semi-circular flap portions connected to said tab portion along a pair of hinge portions. The hinge portions are defined by a substantial reduction in material thickness relative to the thickness of the flap portions and are located substantially adjacent to the tab portion. The additional spoke portions limit the movement of the flap portions of the diaphragm whereby a closed position of the diaphragm is defined when the flap portions are in contact with the spoke portions for preventing fluid flow in the second direction.

A nut member extends around the insert member and engages the first and second pipe sections whereby the front and rear surfaces of the insert member are held in contact with the first and second sealing surfaces of the first and second pipe sections. The nut includes interior surfaces defining first, second and third interior circumferences of the nut wherein a transition between the first and second circumferences defines a ledge for engaging a flange on the first pipe section, and the third circumference includes a threaded portion for engaging a threaded portion of the second pipe section. Thus, as the nut is threaded onto the second pipe section, the ledge defined between the first and second circumferences will draw the flange on the first pipe section axially toward the second pipe section.

When the nut is unthreaded from the second pipe section, it may be slid backwards over the first pipe section to expose the insert member whereby the insert member may be slid transversely to the longitudinal axis of the first and second pipe sections for repair or replacement.

The nut member further includes a second internal ledge between the second and third circumferences for engaging a flange extending radially outwardly from the insert member. The flange on the insert member includes a front and a rear face wherein the front face is positioned adjacent to the second ledge when the front surface of the insert member is in contact with the first sealing surface.

When the rear face of the insert member flange is positioned adjacent to the second ledge, the front surface of the insert member will contact the second sealing surface and prevent engagement between the nut member and the second pipe section. Thus, the nut member and the insert member cooperate to insure that the insert member will be positioned within the assembly in the correct position to allow fluid flow in a forward direction and prevent fluid flow in the reverse direction.

Further, by providing planar contact surfaces on each of the pipe sections for contacting the front and rear faces of the insert member, the insert member may be easily slid out of the assembly for replacement when the nut member is disengaged from the second pipe section.

Other objects and advantages of the invention will be apparent from the following description, the accompanying drawings and the appended claims.

BRIEF DESCRIPTION OF THE DRAWINGS

FIG. 4 is a perspective view showing the check valve assembly partially disassembled.

DETAILED DESCRIPTION OF THE PREFERRED EMBODIMENT

Figure 1:
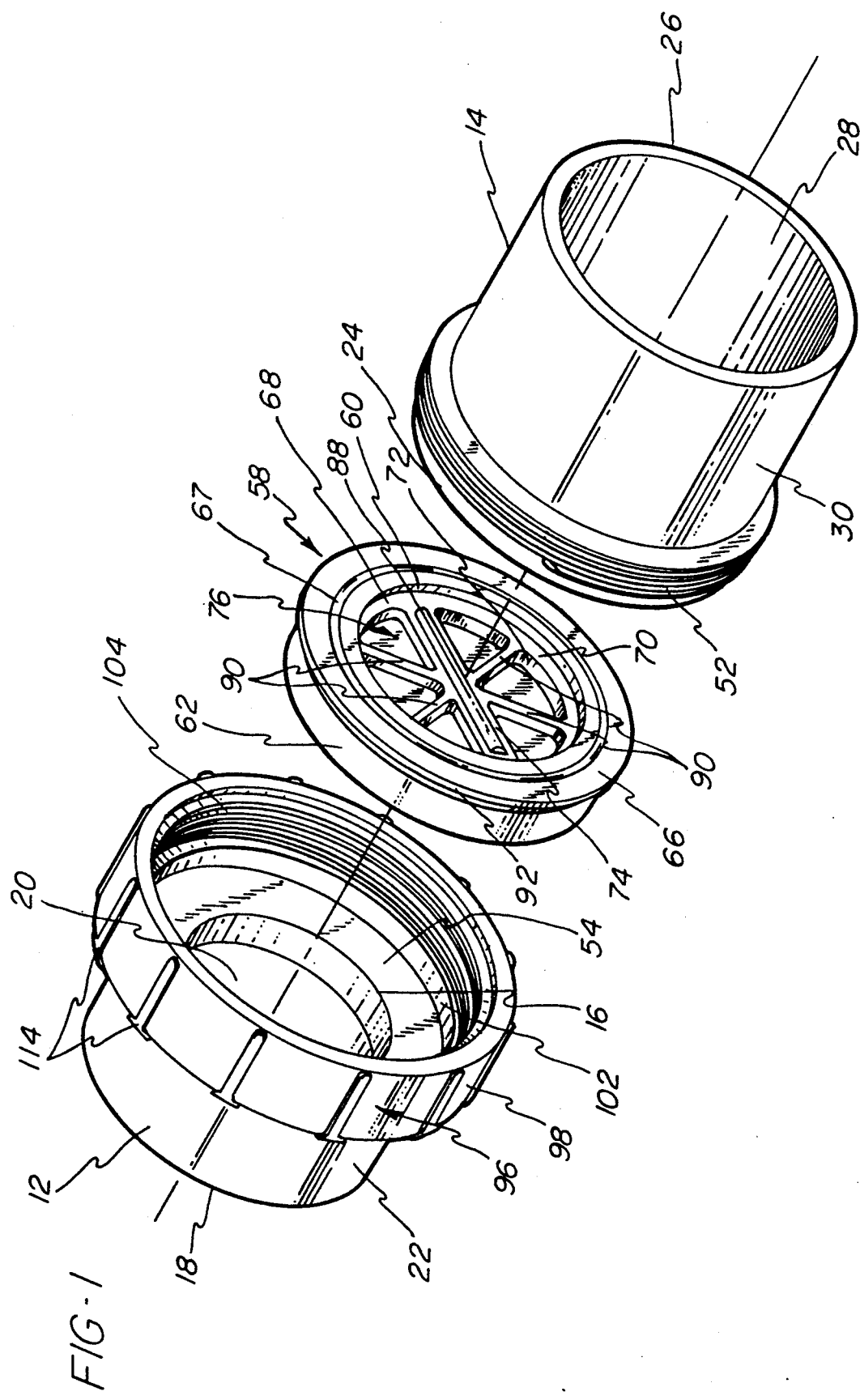
FIG. 1 is an exploded perspective view of the check valve assembly of the present invention.
Figures 2, 3:
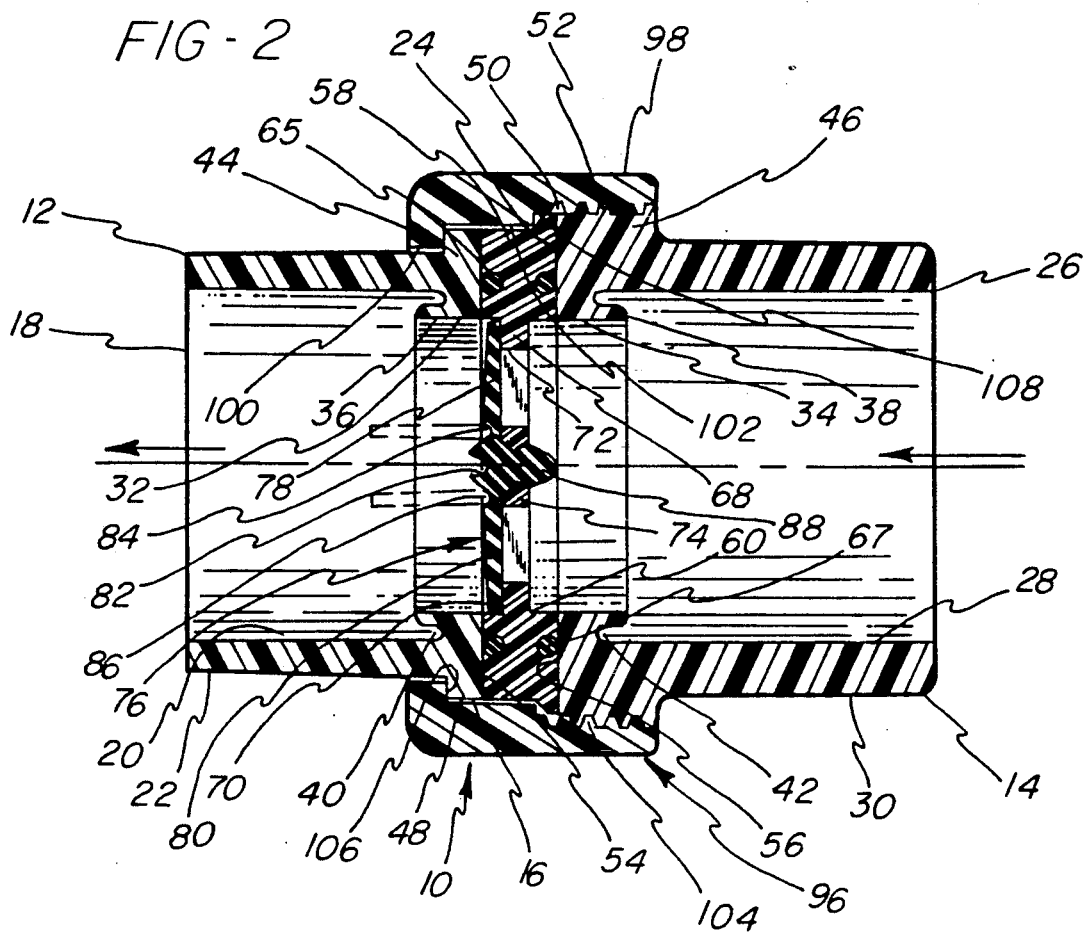
FIG. 2 is an elevational cross-sectional view of the check valve assembly.
FIG. 3 is a perspective view of the front face of the insert member.

Referring to FIGS. 1 and 2, the check valve assembly of the present invention is designated generally as 10 and includes a first hub or pipe section 12 and a second hub or pipe section 14. The first and second pipe sections are preferably formed of PVC such that they will be resistant to chemicals typically used in pools and spas.

The first pipe section 12 includes opposing first and second ends 16, 18 and has substantially cylindrical inner and outer walls 20, 22 between the first and second ends 16, 18. Similarly, the second pipe section 14 has first and second ends 24, 26 and substantially cylindrical inner and outer walls 28, 30.

Each of the first and second pipe sections 12, 14 include an inner flange portion 32, 34, respectively, extending radially inwardly from the pipe section inner walls 20, 28 and defining a minimum circumference of each of the pipe sections 12, 14. Each of the inner flanges 32, 34 include annular lip portions 36, 38 which extend axially from the flanges 32, 34 along the minimum circumference of the pipe sections and in a direction from the first to the second end of each of the pipe sections 12, 14 whereby an annular groove 40, 42 is defined for each of the pipe sections 12, 14 between the annular lips 36, 38 and the inner walls 20, 28. The annular grooves 40, 42 form solvent traps within the pipe sections 12, 14 for collecting excess solvent which may be present when PVC pipe is joined to the check valve assembly 10 through insertion of the pipe into the pipe sections 12, 14 wherein the solvent is used for adhering the PVC pipe to the pipe sections 12, 14.

It should be noted that although the first and second pipe sections 12, 14 are provided with solvent traps 40, 42 particularly adapted for installations in which pipe is installed interiorly of the pipe sections 12, 14 in contact with inner walls 20, 28, the present invention may also be used in installations wherein the second end 26 of the second pipe section 14 is positioned in abutting contact with the end of a pipe supplying fluid for flow through the check valve assembly 10. In this type of connection with the fluid supply line, a collar is typically provided extending over both the supply line and the outer wall 30 to hold the two abutting ends in contact with each other. The advantage in this type of connection resides in the fact that the flow cross-section defined by the supply pipe is essentially the same as the flow cross-section defined by the valve assembly 10 such that cavitation conditions resulting from variations in the cross-sections of the piping will be avoided.

Each of the pipe sections 12, 14 further include an outer flange 44, 46 extending radially outwardly from respective outer walls 22, 30. A radially outer surface 48 of the flange 44 defines a maximum circumference of the first pipe section 12. The second pipe section flange 46 includes a substantially smooth annular surface 50 adjacent to the first end 24 and a threaded portion 52 which defines a maximum circumference of the pipe section 14 greater than the circumference of the annular portion 50.

The first pipe section 12 includes a substantially planar annular end surface 54 located at the first end 16 thereof and extending radially from the minimum circumference of the flange 32 to the maximum circumference surface 48. Similarly, the second pipe section 14 includes a substantially planar annular end surface 56 located at the first end 24 of the second pipe section 14 and extending radially from the minimum circumference of the inner flange 34 to the annular surface 50 of the outer flange 46. The planar annular end surfaces 54, 56 form first and second sealing surfaces for cooperation with an insert member 58, as will be described further below.

Referring to FIGS. 1-3, the insert member 58 is formed as a disk-shaped member preferably made of PVC and having substantially cylindrical inner and outer walls 60, 62, and substantially planar front and rear annular surfaces 64, 66. The front and rear surfaces 64, 66 are delimited by inner and outer circumferences substantially equal to the inner and outer circumferences of the sealing surfaces 54, 56, respectively. In addition, each of the front and rear surfaces 64, 66 includes an annular groove for receiving and retaining a respective O-ring 65, 67 seal whereby a positive seal may be formed between the insert 58 and the two pipe sections 12, 14.

An inner insert flange 68 extends radially inwardly from the inner wall 60 to define a shallow valve seat surface 70 spaced axially from the front annular surface 64. An inner surface 72 of the flange 68 defines an aperture through the insert member 58 for permitting fluid flow therethrough.

A main spoke member 74 extends diametrically across the aperture in the insert 58 and is provided for supporting an elastomeric diaphragm member 76. The diaphragm member 76 includes a pair of semi-circular flap portions 78, 80 and a centrally located elongated tab member 82. The flap portions 78, 80 are connected to the tab member 82 by elongated hinge portions 84, 86 located adjacent to the tab portion 82 and defined by a substantial reduction in thickness of the material forming the flap portions 78, 80 immediately adjacent to the tab portion 82.

The diaphragm 76 is attached to the main spoke member 74 by means of an elongated extension 88 of the tab member 82 which extends through an elongated aperture formed in the main spoke member 74.

Additional spoke members 90 are provided extending diametrically across the aperture in the insert member 58 and intersecting the main spoke member 74. The additional spoke members 90 limit the movement of the diaphragm flap portions 78, 80 toward the rear face 66 of the insert member 58 to thereby facilitate seating of the flap portions 78, 80 on the seating surface 70 defining a closed position for the check valve assembly 10.

Thus, the insert member 58 and diaphragm 76 cooperate to form a regulator portion for the valve assembly 10 wherein the flap portions 78, 80 may move forwardly toward the front face 66 and away from the seating surface 70 to allow forward flow of fluid through the insert member 58 in a direction from the rear face 66 toward the front face 64, as depicted in phantom lines in FIG. 2. In addition, the flap portions 78, 80 may seat on the seating surface 70 to prevent reverse flow from the front face 64 toward the rear face 66. The additional spoke members 90 act to provide further support for the diaphragm flap portions 78, 80 to prevent these portions from collapsing and moving rearwardly of the flange 68 which could result in leakage past the valve during reverse flow conditions.

The insert member 58 further includes a collar portion 92 extending radially outwardly from the outer side wall 62 adjacent to the rear annular surface 66 and defining a maximum circumference of the insert 58. The rear face of the insert collar 92 is coplanar with the rear face 66 of the insert member 58 and includes a front face 94 axially spaced from the rear face.

The check valve assembly 10 further includes a nut member 96 which performs the dual function of fastening the two pipe sections 12, 14 together and insuring that the insert member 58 is placed within the check valve assembly 10 with the front face 64 facing toward the first sealing surface 54 of the first pipe section 12. The nut member 96 is formed with a substantially cylindrical outer wall 98 and interior surfaces defining varying interior circumferences for cooperating with the first and second pipe sections 12, 14 and with the insert member 58.

As may be best seen in FIG. 2, three different interior circumferences are defined within the nut member 96. A first circumference 100 is provided substantially corresponding to the circumference of the outer wall 22 of the first pipe section 12 with sufficient clearance between the surfaces 22, 100 to allow the nut member 98 to slide relative to the first pipe section 12. A second interior circumference is defined by surface 102, which circumference substantially corresponds to the circumference of the outer wall 48 of the flange 44 and to the circumference of the outer wall 62 of the insert member 58 with sufficient clearance to allow the nut member to move relative to the flange 44 and insert member 58. A third circumference is defined by a threaded portion 104 within the nut member 98 and is configured to cooperate with the threaded portion 52 formed in the flange 46 of the second pipe section 14.

Thus, a first ledge 106 is defined at the transition between the first and second interior circumferences 100 and 102, respectively, and a second ledge 108 is defined at the transition between the second and third circumferences formed by surfaces 102 and 104, respectively. The first ledge 106 cooperates with the flange 44 on a side opposite from the sealing surface 54 to draw the first pipe section 12 toward the second pipe section 14 as the nut member 98 is rotated to cause engagement between the threaded surfaces 52 and 104 whereby the front and rear faces 64, 66 and O-rings 65, 67 of the insert member 58 are pressed into sealing engagement with the first and second sealing surfaces 54, 56 of the first and second pipe sections 12, 14.

Further, as may be seen in FIG. 4, upon disengagement of the threaded portions 52 and 104 from each other, the nut member 98 may be slid along the first pipe section 12 to expose the insert member 58 sandwiched between the two pipe sections 12, 14. The insert member 58 may then be slid transverse to the longitudinal axis of the pipe sections 12, 14 in order to remove the insert member for repair or replacement without moving the first and second pipe sections 12, 14 relative to each other. This is particularly important when the check valve assembly 10 is in position in a piping system wherein the check valve pipe sections 12, 14 are rigidly attached to adjoining pipe sections 110, 112 such that a break away structure in which the nut member 96 is movable longitudinally is required to expose the insert member 58 for permitting a transverse movement of the insert member 58 to effect removal and repair of the check valve without disturbing adjoining pipe sections 110, 112.

This break away structure is also useful in the event that debris becomes lodged within the piping system adjacent to the check valve assembly. In such an event, the insert member 58 may be removed and a tool may be inserted in the space between the sealing surfaces 54, 56 to grasp and remove the debris.

The nut member 98 and insert 58 are additionally designed to cooperate with each other such that if the rear face 66 of the insert member 58 is inserted in facing relationship to the first sealing surface 54, the structure will prevent the threaded portions 52 and 104 from engaging with each other to draw the pipe sections 12, 14 together. This result is obtained by forming the insert collar 92 with a circumference which is greater than the second interior circumference 102 of the nut member 98 such that the outer edge of the rear face 66 defining the collar 92 will engage the second ledge 108 if the insert member 58 is mounted in the assembly backwards.

Further the distance between the front and rear insert faces 64, 66 is selected such that when the insert member 58 is mounted backwards within the assembly, the body of the insert member 58 will extend along the length of the threaded portion 104 a sufficient distance to prevent positive engagement of the threads of the section 104 with the threaded portion 52. In this manner, the insert member 58 cooperates with the nut member 96 to insure that the diaphragm 76 is facing in the correct direction to allow forward flow and prevent back flow through the system. In other words, when the insert member 58 is mounted incorrectly, the rear surface 66 will rest on the second ledge 108 and the front face 64 will engage the second sealing surface 56 to space the threaded portions 52, 104 from each other a sufficient distance to prevent the engagement of the threads of these two portions.

As an additional feature facilitating installation and use of the present invention, the nut member 96 may be molded with arrows 114 on the exterior surface thereof such that the direction of flow of fluid through the valve assembly 10 is clearly indicated.

As can be seen from the above description, the present invention provides a check valve assembly which may be easily incorporated into a conventional pool or spa plumbing system and which may be easily repaired if the regulator portion of the check valve assembly should deteriorate. In addition, the component elements of the check valve assembly are designed such that improper assembly of the check valve is prevented to avoid damage to a fluid piping system which could occur if the insert member were inserted backwards into the assembly.

It should also be noted that the present assembly is designed to withstand back pressures of up to 9 psi. In addition, the hinged flap design of the diaphragm member provides free movement of the flap portions away from the insert aperture to allow maximum clearance for fluid flow through the valve assembly such that minimum pressure drop occurs during maximum fluid flow.

While the form of apparatus herein described constitutes a preferred embodiment of the invention, it is to be understood that the invention is not limited to this precise form of the apparatus and that changes may be made therein without departing from the scope of the invention which is defined in the appended claims.

What is claimed is:

1. A check valve assembly comprising:
   a first pipe section having a first sealing surface,
   a second pipe section having a second sealing surface,
   an insert member having front and rear surfaces engaging said first and second sealing surfaces, respectively,
   means defining an aperture through said insert member,
   a resilient diaphragm member extending across said aperture and including a tab portion and a pair of semi-circular flap portions connected to said tab portion along a pair of hinge portions, said hinge portions being defined by two elongated areas having a substantial reduction in material thickness relative to a thickness of said flap portions, said flap portions each defining upper and lower flap surfaces wherein each of said upper and lower flap surfaces lie in a single plane extending from a location adjacent to said hinge portion to a peripheral edge of a respective flap portion defining a radial outer boundary of said diaphragm member, said diaphragm member allowing fluid flow through said insert member in a first direction and preventing fluid flow through said diaphragm in a second direction, and
   a nut member extending around said insert member and engaging said first and second pipe sections for holding said front and rear surfaces in contact with said first and second sealing surfaces.

2. The assembly of claim 1, wherein said first and second pipe sections define a longitudinal axis and said nut member is longitudinally movable parallel to said longitudinal axis.

3. The assembly of claim 2, wherein said first and second pipe sections are spaced from each other and said nut member may be disengaged from said second pipe section to permit said insert member to be moved transverse to said longitudinal axis out of contact with said first and second sealing surfaces without altering the spacing between said first and second pipe sections.

4. The assembly of claim 1, wherein said insert member includes a main spoke member extending diametrically across said aperture and said diaphragm member is attached to said insert member at said main spoke member.

5. The assembly of claim 4, wherein a plurality of additional spoke members are provided extending diametrically across said aperture and intersecting said main spoke member, said additional spoke members limiting movement of said diaphragm to define a closed position for said diaphragm for preventing fluid flow in said second direction.

6. The assembly of claim 1, wherein said front and rear surfaces are substantially planar and said insert member includes a flange extending radially inwardly and positioned in spaced relation to said front and rear surfaces and defining said aperture, said flange forming a seat for engaging a peripheral edge of said diaphragm member.

7. The assembly of claim 6, including a spoke member attached to said flange and extending diametrically across said aperture, said diaphragm member being attached to said spoke member.

8. A check valve assembly comprising:
   a first pipe section having a first sealing surface,
   a second pipe section having a second sealing surface,
   an insert member having front and rear surfaces engaging said first and second sealing surfaces, respectively,
   means defining an aperture through said insert member,
   a diaphragm member extending across said aperture, said diaphragm member allowing fluid flow through said insert member in a first direction and prevention fluid flow though said diaphragm in a second direction,
   a nut member extending around said insert member and engaging said first and second pipe sections for holding said front and rear surfaces in contact with said first and second sealing surface, and
   wherein said nut member includes an internal ledge and said insert member includes a flange extending radially outwardly and having a front and a rear face, said front face being positioned adjacent to said ledge when said front surface is in contact with said first sealing surface and said front surface contacting said second sealing surface and preventing engagement between said nut member and said second pipe section when said rear face is positioned adjacent to said ledge whereby said insert member may only be positioned in said assembly with said front surface in contact with said first sealing surface.

9. The assembly of claim 1, including radially inwardly extending flanges formed on said first and second pipe sections adjacent to said first and second sealing surfaces and annular lip portions extending axially from said flanges to define a solvent trap between said lip portions and inner walls of said pipes.

10. A check valve assembly comprising:
    first and second pipe sections,
    first and second substantially planar sealing surfaces formed on said first and second pipe sections, respectively,
    a substantially disk-shaped insert member having substantially planar front and rear surfaces for contacting said first and second sealing surfaces,
    means defining an aperture through said insert member,
    a collar portion extending radially outwardly form said insert member adjacent to said rear surface and spaced from said front surface,
    an elastomeric diaphragm extending across said aperture, and
    a nut member extending around said insert member and engaging said first and second pipe sections for holding said front and rear surfaces in contact with said first and second sealing surfaces.

11. The assembly of claim 10, including first and second radially extending ledge portions within said nut member, said first pipe section having a radially extending flange for contacting said first ledge portion.

12. The assembly of claim 11, including threaded portions formed on said second pipe section and within said nut member for cooperating with each other, said collar portion of said insert being dimensioned to be received within said nut member to contact said second ledge and wherein said front and rear surfaces are spaced a predetermined distance such that when said rear face of said insert is positioned facing said second ledge, said front face will prevent said threaded portions on said nut member and said second pipe section from engaging with each other.

* * * * *